(12) United States Patent  
McCullough

(10) Patent No.: US 9,126,521 B1  
(45) Date of Patent: Sep. 8, 2015

(54) WINCH SUPPORTED CARGO STRAP LAUNCHING DEVICE

(71) Applicant: David McCullough, Greeley, CO (US)

(72) Inventor: David McCullough, Greeley, CO (US)

( * ) Notice: Subject to any disclaimer, the term of this patent is extended or adjusted under 35 U.S.C. 154(b) by 0 days.

(21) Appl. No.: 14/307,168

(22) Filed: Jun. 17, 2014

Related U.S. Application Data

(63) Continuation-in-part of application No. 14/263,047, filed on Apr. 28, 2014.

(51) Int. Cl.
*B60P 7/08* (2006.01)

(52) U.S. Cl.
CPC .............. *B60P 7/0853* (2013.01); *B60P 7/083* (2013.01)

(58) Field of Classification Search
CPC ........ B60P 7/083; B60P 7/70853; B65L 1/00; B25B 9/00; B25B 13/025; B25F 1/00; B25F 3/00; B25F 5/00
USPC .................... 410/97, 98, 99, 100, 156; 43/19; 81/489, 490; 294/15, 24; 16/426, 427, 16/429; 7/167, 168; 74/544, 548
See application file for complete search history.

(56) References Cited

U.S. PATENT DOCUMENTS

| | | | | |
|---|---|---|---|---|
| 6,102,637 | A * | 8/2000 | Mocci | 410/103 |
| 7,393,031 | B2 * | 7/2008 | Goulet | |
| 8,915,685 | B2 * | 12/2014 | Flores et al. | 410/99 |

* cited by examiner

*Primary Examiner* — Stephen Gordon
(74) *Attorney, Agent, or Firm* — Scott L. Terrell, P.C.; Scott L. Terrell

(57) ABSTRACT

A winch supported cargo strap coil launching device has a telescopic cantilever beam. A transverse support member has a first end connected to a first lateral side wall of an outer cantilever beam tubular member, and a second end capable of being carried in a spool aperture of a cargo strap winch assembly. A U-shaped bracket member has a base connected to a distal end of an inner tubular cantilever beam member, and a first and second parallel legs extending outwardly at opposite ends thereof. The parallel legs include respectively aligned apertures adapted to pivotally connect a launching pole to the cantilever beam assembly. The launching pole has an upper end and a lower end. The lower end is pivotally connected to the U-shaped bracket. A cargo strap coil bucket is connected to the upper end of the launching pole, and has a generally rectangular ejection opening so that the bucket is capable of retaining and then releasing the cargo strap coil by exerting an upward thrusting motion on the pole.

8 Claims, 6 Drawing Sheets

US 9,126,521 B1

WINCH SUPPORTED CARGO STRAP LAUNCHING DEVICE

CROSS REFERENCE TO RELATED APPLICATIONS

Pursuant to 35 U.S.C. 120, the Applicant claims the benefit of U.S. Ser. No. 14/263,047 filed Apr. 28, 2014, pursuant to 35 U.S.C. 111(a)

STATEMENT OF FEDERALLY SPONSORED RESEARCH

Not Applicable.

BACKGROUND OF THE INVENTION

1. Field of the Invention

The present invention relates to securing cargo. In particular, it relates to a winch supported cargo strap coil launching apparatus for catapulting coiled cargo straps over a stacked load carried on a Conestoga-type or stake bed trailer.

2. Description of the Related Art

Persons concerned with the loading or transport of stacked cargo either manually drape, or throw, cargo straps over a load to retain the cargo in place during transit. In the case of stacked or tall loads, the cargo strap is typically formed in a coil, and the coil is manually thrown over the cargo. The opposite ends of the un-coiled straps are then secured in place to side rails of the stake bed. A problem exists, however, in so far as the coiled portions are awkward to manipulate, heavy, and difficult to throw over widely stacked or tall loads.

One such solution to the foregoing problem is disclosed in U.S. Pat. No. 7,393,031, to Goulet. There, a strap launcher has a bucket like coil retainer at one end of a longitudinally-extending pole handle. The coiled portion of the strap is inserted into the coil retainer with the other end of the strap secured to the retainer. In operation, a person grasps the pole handle with both hands, and casts the coiled strap from the retainer, using an overhanded motion, which is not unlike that of a person casting a fishing lure into the ocean.

While the foregoing strap launcher offers some utility it is inefficient in leverage because in requires one to lift and balance the pole handle, coil retainer, and coiled cargo strap while attempting to cast the entire assembly with the arms, back, shoulders and legs, on a predetermined trajectory, so that the coiled strap accurately clears the stacked load. Moreover, it would also be difficult to operate in slippery or windy conditions because it requires a firm foothold and a proper trajectory to deploy the coiled portion of the strap over wide or tall stacked loads. Thus, what is needed is an improved coiled strap launcher which is easy to use in a wide variety of weather conditions, provides sufficient leverage without requiring the user to exert an undue amount of physical stress on the person's arms, back, shoulders and legs, but which is simple in construction and use. The present invention satisfies these needs.

BRIEF SUMMARY OF THE INVENTION

It is therefore an object of the present invention to provide an improved coiled strap launcher which is easy to use under a variety of weather conditions, provides sufficient leverage without requiring the user to exert an undue amount of physical stress on the person's arms, back, shoulders and legs, but which is also simple in construction and adaptable for use in combination with a wide variety of truck bed or trailer cargo loads.

It is yet another object of the present invention to provide an improved coiled strap launcher which is easily mountable for support on a track strap winch assembly so that the coiled strap launcher slides easily along a predetermined length of a cargo trailer bed.

To overcome the problems associated with the prior art, and in accordance with the presently intended purpose of the invention, as embodied and broadly described herein, briefly, a cargo strap coil launching device is provided. A cantilever beam assembly has an inner tubular member co-axially disposed in forming a telescoping joint connection with an outer tubular member. A transverse support member has a first end connected to a first lateral side wall of the outer tubular member, and a second end capable of being carried along a longitudinal axis of a spool aperture of a cargo strap winch assembly. An outwardly extending U-shaped bracket member has a base connected to a distal end of the inner telescopic tubular member, and a first and second parallel legs extending outwardly at opposite ends thereof. The parallel legs include respectively aligned apertures adapted to pivotally connect a launching pole to the cantilever beam assembly. The launching pole has an upper end and a lower end. The lower end is pivotally connected to the U-shaped bracket. A cargo strap coil bucket has a generally rectangular ejection opening so that the bucket is capable of retaining and then releasing the cargo strap coil by exerting an upward thrusting motion on the pole. The bucket includes a back wall. The back wall has a connector, such as a pipe, being adapted to connect the back wall to the upper end of the pole.

Additional advantages of the present invention will be set forth in part in the description that follows, and, in part, will be obvious from that description or can be learned from practice or testing of the present invention. The advantages of the preferred embodiments of the present invention can now be realized and obtained by the invention as more particularly pointed out in the appended claims.

BRIEF DESCRIPTION OF THE SEVERAL VIEWS OF THE DRAWINGS

The accompanying drawings, which are incorporated in and which constitute a part of the specification, illustrate at least one embodiment of the present invention and, taken together with the description, explain the principles of the invention.

DETAILED DESCRIPTION OF THE DRAWINGS

Figure 1:
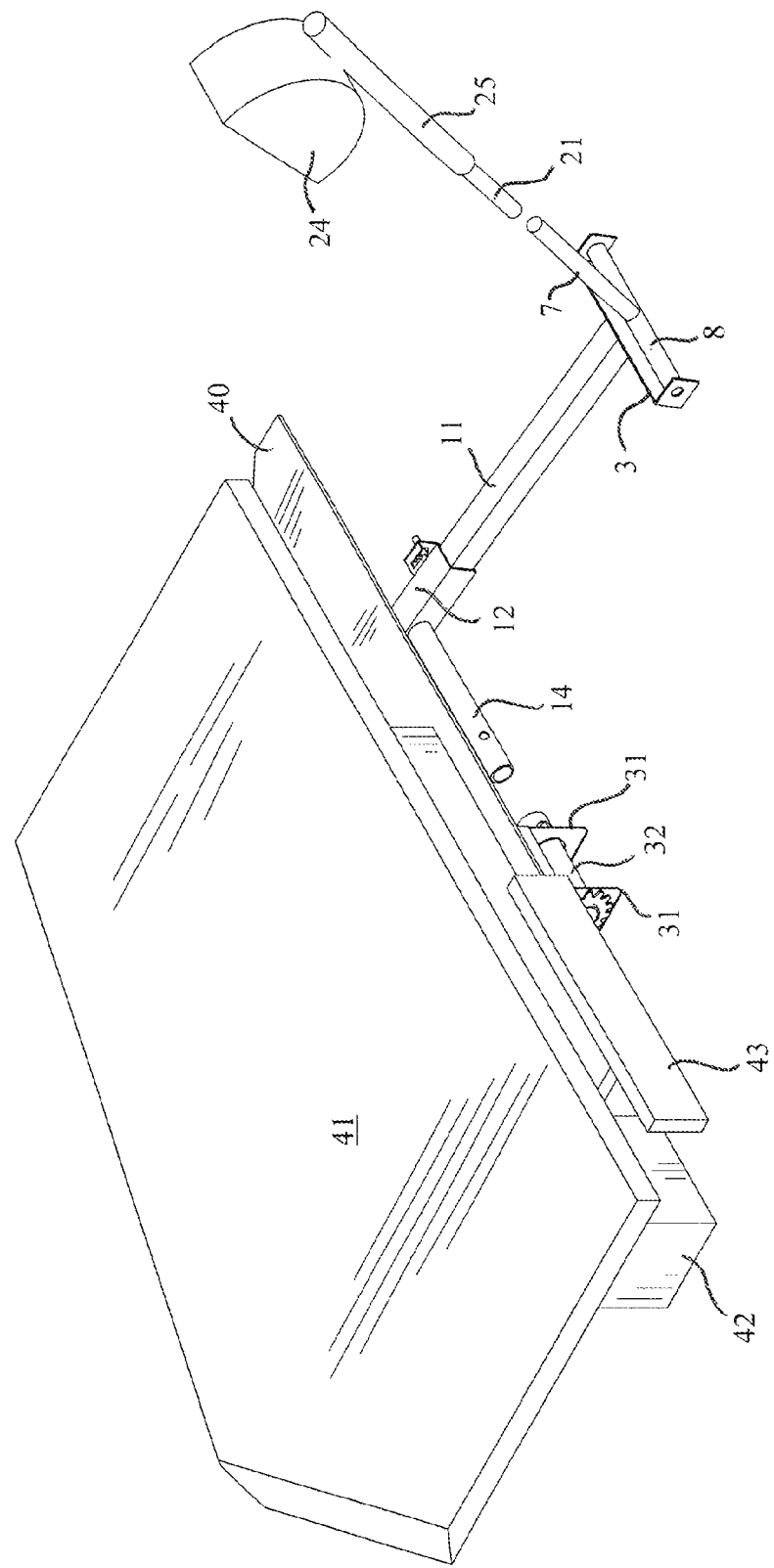
FIG. 1 is an isometric top view of the present invention properly aligned for insertion into the spool aperture of a track supported cargo strap winch.
Figure 2:
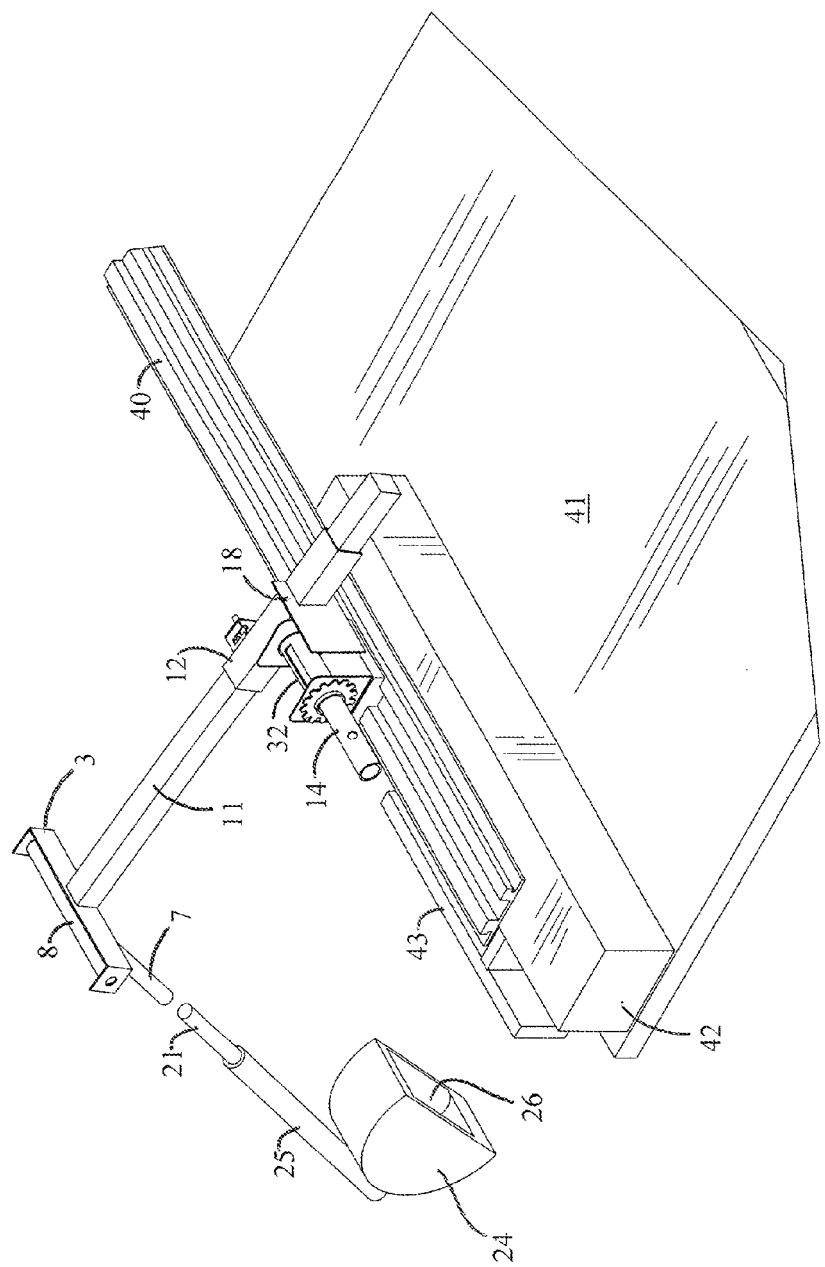
FIG. 2 is an isometric bottom view of the present invention after being inserted for support in the spool aperture of the track supported cargo strap winch.

Unless specifically defined otherwise, all scientific and technical terms, used herein, have the same ordinary meaning as would be commonly understood by one of ordinary skill in the art to which this invention belongs.

As used herein the term "proximal" means that portion of the present invention being aligned with respect to other portions which is positioned most closely adjacent to the trailer bed frame. The term "distal" means that portion of the present invention being aligned with respect to other portions which is positioned furthest away, e.g., outboard, from the trailer bed frame. For example, a "distal face" is that face of a member viewed when look toward the trailer bed, and a "proximal end" is that end of a member being closest to the trailer bed with respect to another end, or portion of the same member.

The present invention is a winch supported cargo strap launching device. Cargo strap winches are used for tightening a cargo-retaining strap to secure cargo on flat bed trailers. In particular, it is intended for use with a track supported cargo strap winch. Track supported winches are well known. For example, U.S. Pat. No. 5,853,164, to Hunt, and U.S. Pat. No. 8,328,480, to Booher, each discloses improvements to track supported winch assemblies which are contemplated for use with the present invention. The Hunt (U.S. Pat. No. 5,853,164) and Booher (U.S. Pat. No. 8,325,480) disclosures are incorporated by this reference, as though fully set forth herein.

Referring now to the drawing figures, wherein like numerals represent like features of the presently preferred embodiments of the present invention, a winch mounted cargo strap launching device is provided.

In general, track supported cargo strap restraining winches have steel or aluminum frames. The frames include a base 30. The base 30 has first and second separate locations for sliding receipt of a double-L track. The track 40 is connected to, or formed as a part of, a cargo trailer or cargo bed 41. First 31 and second 31 parallel legs are welded, or formed, to the base 30 and cooperate with the base 30 to define the frame with an inverted U-shaped structure. A spool 32 is retractably supported by the legs 31, and includes a slot 33 in which a cargo-retaining strap is inserted and then wound around the spool 32 for storage or use. The strap is played out from the spool 32, as needed, by counter-clockwise rotation of the spool 32, and retracted, as needed, by clockwise rotation of the spool 32. The spool 32 includes a driving head that projects outwardly from a sidewall and that is engaged by a winch bar to rotate the spool 32. The spool 32 is a pipe like structure having a longitudinal aperture 34 there-through. A ratchet wheel 35 is welded to the spool 32 and rotates therewith adjacent an outer face of a sidewall. A pawl is pivotally secured to the sidewall by a bolt, pin or other fastener.

The cantilever beam assembly has an inner tubular member 11 co-axially disposed in forming a telescoping joint connection with an outer tubular member 12. In order to secure a staked load which is wider than the overall width of the stake bed 41 and rail 43 assembly, the telescoping cantilever beam assembly is extendable outwardly so that one is able to move the launching pole 21 and bucket 24 outwardly from under the load to be restrained. The cantilever beam assembly is desirably constructed of square or rectangular tubular members which are formed either of structural steel, aluminum or composites.

The cantilever beam assembly is mounted in the longitudinal aperture 34 of a winch spool 32 of a cargo strap winch. The transverse support member 14 has a first end connected to a first side wall 16 of the outer tubular member 12, of the cantilever beam assembly, and a second end extending, outwardly therefrom, a sufficient distance so that the second end of the transverse support member 14 is capable of being carried in the longitudinal aperture 34 of the spool 32 of the cargo strap winch assembly. In the preferred embodiment, the transverse support member 14 is a hollow pipe with one end welded to the first lateral side wall 16 of the outer tubular member 12 with the other end including respectively aligned clear holes adapted to receive a pin (not shown) in order to secure the cantilever beam assembly from sliding out of the spool aperture 34, in use.

A transverse plate member 18 is desirably included to provide a second point of connection with the first 31 and second 31 legs of the strap winch frame so that the cantilever beam assembly is capable of supporting an axial load without biasing against the trailer bed or bed frame. In this manner the cantilever beam member is capable of sliding in conjunction with the strap winch when used on track 40 supported systems. The transverse plate member 18 preferably includes a void having a generally C-shaped profile fashioned in fitment with an outer profile configuration of the outer tubular member. The peripheral inner edges forming the C-shaped void are connected to a top, bottom, and first lateral sidewall 16 faces of the outer tubular member 12, and is positioned in a measured distance between the cylindrical transverse support member 14 and a proximal end of said outer tubular member 12 so that a distal face of the plate 18 is capable of bearing against the frame legs 31 of the track supported cargo strap restraining winch assembly to support an axial load exerted on the cantilever beam assembly. Again, this feature facilitates exertion of an axial load on the cantilever beam assembly to be fully supported by the two-point connection with the winch assembly, being: (1) the transverse member connection with the spool aperture 34 connection; and (2) the plate 18 biasing connection against the winch frame legs 31, which effectively limits downward rotation of the cantilever beam assembly. In this manner, the proximal end of the inner tubular member 14 is suspended freely below a lower surface of either the trailer frame 42, or bed 41, enabling the launching device to slide back-and-forth in when mounted on a track supported cargo strap wench.

The cantilever beam assembly is in pivotal connection with a launching pole lower end. One can readily appreciate that this pivotal connection may be accomplished by any combination of elements and methods, or means, which are well known in the art. For example, it is desirably to construct the pivotal connection as a pinned connection. To this end, and in the presently preferred embodiment, the pivotal connection is established using a combination of an outwardly extending U-shaped bracket member 3, bar member 4, and sleeve pinned connection. The U-shaped bracket member 3 is desirably constructed with a bent formation being at right angles, adjacent to the outer edges thereof, to form opposing first and second parallel legs 6. The legs 6 include respectively aligned apertures 5. The apertures 5 are dimensioned for desirably receiving a structural supporting bar member 4 to establish a pinned connection of the cantilever beam assembly with the lower end of the launching pole 21. In an alternative, the supporting bar 4 may be an integral structural T-shaped formation being the lower end of the launching pole 21, itself (not shown), but, again, is desirably a separate rigid bar member 4, of sufficient diameter and strength, to support an axial load exerted on the cantilever beam assembly. In this manner, the supporting bar member is capable of sliding engagement with the apertures 5 to aid in assembly and disassembly, of the launching pole 21 and bucket 24 assembly of the present invention, for convenient storage and use.

Figure 6:
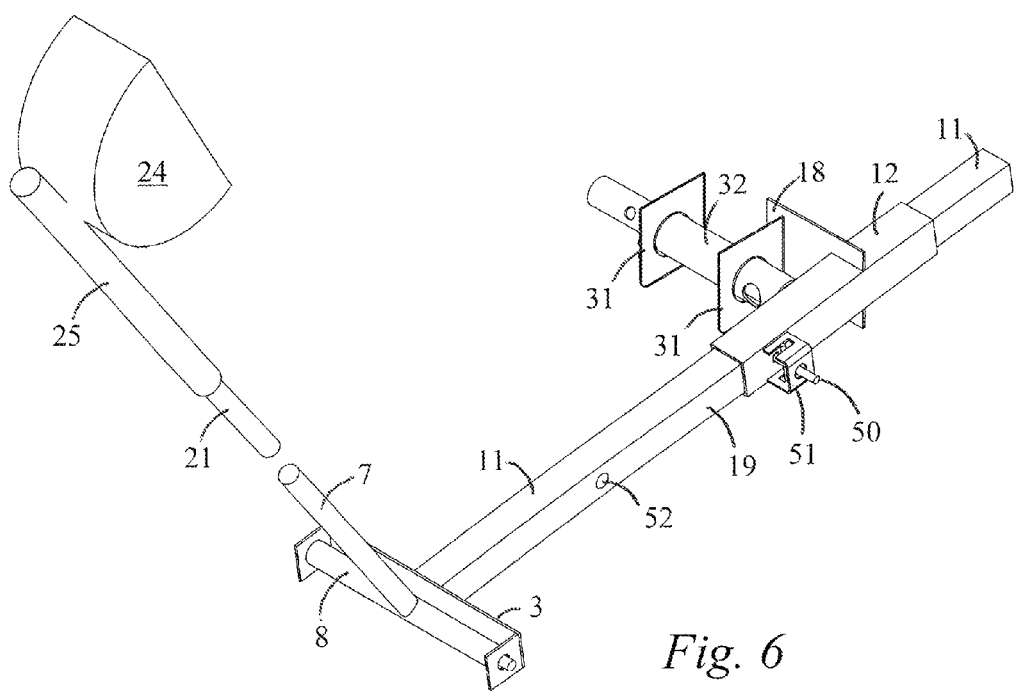
FIG. 6 is an isometric top view showing the right-hand side of the illustration described above as FIG. 5.

In the presently preferred embodiment, a generally T-shaped pipe connector is provided to pivotally connect the lower end of the launching pole 21 to the U-shaped bracket 3. Here, by way of example and as shown in the drawing FIGS. 1, and 6, the T-shaped connector is desirably a pipe connector having an elongated hollow pipe sleeve 8 including a pair of horizontally aligned branches extending outboard an upstanding vertical pipe branch 7. The elongated hollow pipe sleeve 8 operates to rotate circumferentially about the supporting bar member 4. The supporting bar 4 is carried in the apertures 5 in the U-shaped bracket legs 6 to establish a pivotal pinned connection. With this embodiment, the vertical branch 7 may be either formed as a hollow, semi hollow, or solid body being limited only in-so-far as it is capable of splicing with the lower end of the launching pole 21. The foregoing description of this embodiment is preferably a configuration which simply facilitates the assembly and disassembly for use and storage.

Figure 3:
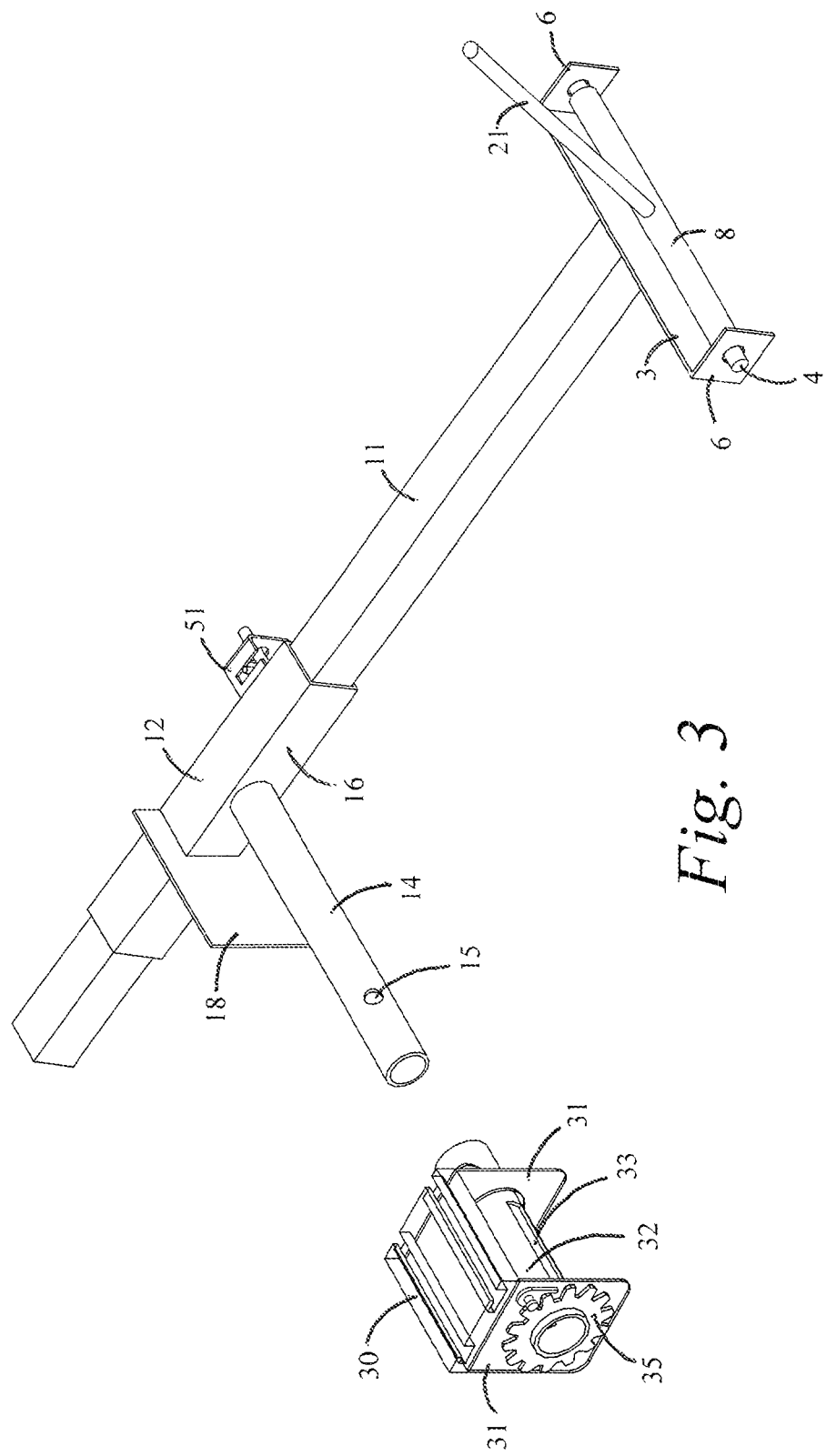
FIG. 3 is an isometric top view showing the left-hand side of the cantilever beam assembly, track supported cargo strap winch, and an embodiment where the lower end of the launching pole is a one piece T-shaped structure including the T-shaped connector sleeve being in pivotal attachment with the U-shaped bracket.
Figure 4:
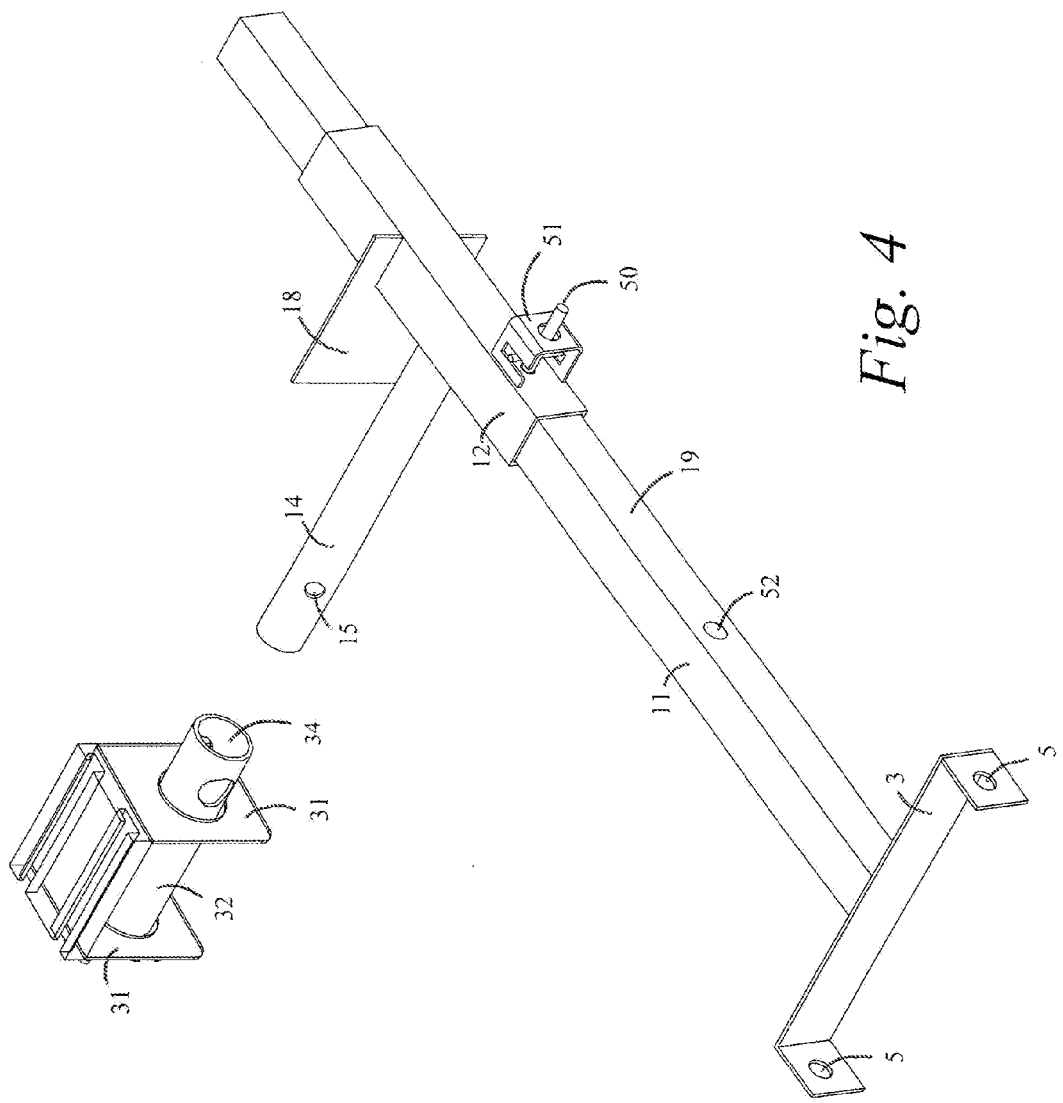
FIG. 4 is an isometric top view showing the right-hand side of the cantilever beam assembly, transverse plate member, track supported wince assembly, and stop pin assembly.
Figure 5:
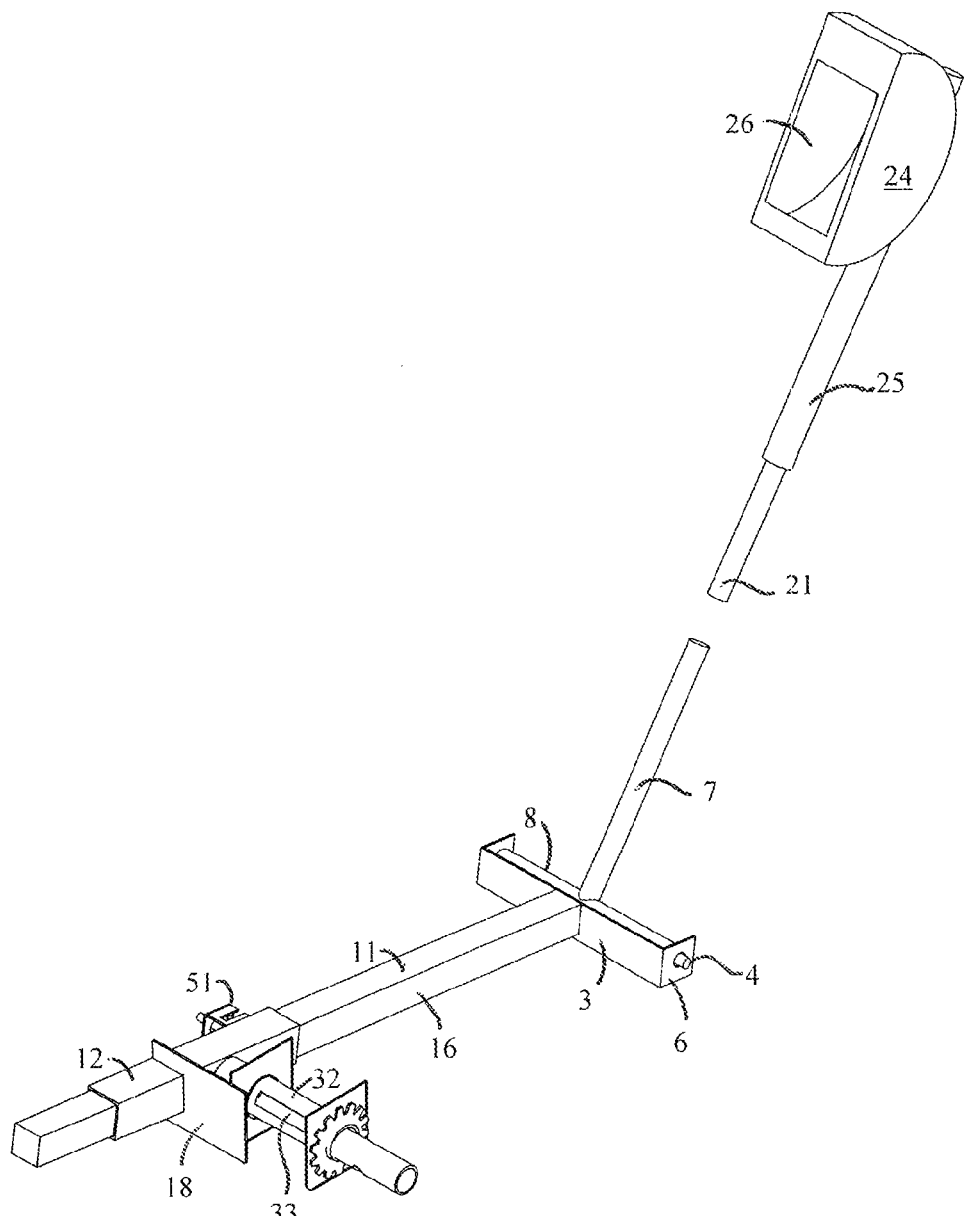
FIG. 5 is an isometric top view showing the left-hand side of the present invention in an embodiment where a T-shaped hollow pipe connector pivotally connects the lower end of the launching pole to the U-shaped bracket, with the cantilever beam assembly inserted into the spool aperture. The base of the cargo winch strap frame is intentionally not illustrated in this drawing figure so that one is able to view the internal components of a typical cargo winch strap assembly.

With yet another example, as shown in FIG. 3, the T-shaped connector may be an integral piece of the lower end of the launching pole 21 whereby the launching pole 21 includes the horizontally aligned branches of the elongated hollow pipe sleeve 8.

The launching pole 21 has an upper end and a lower end. The launching pole 21 may, but need not be constructed of any resilient material which is well known in the art such as aluminum, fiberglass, steel, carbon fiber, or of a polymeric composition. The launching pole 21 may either be either a solid, semi-solid, or hollow body, include portions of the same. As above, the lower end may be formed for splicing, as a T-shape for pivoting, but is in pivotal relationship to the cantilever beam assembly for launching the cargo strap coil.

A cargo strap coil bucket 24 has a generally rectangular ejection opening 26 so that the bucket 24 is capable of retaining and then releasing the cargo strap coil (not shown) by exerting an upward casting motion on the launching pole. The bucket 24 includes a back wall. The back wall desirably includes a pin or sleeve connector 25, such as a pipe, depending upon the desired splice to be made with the upper end of the launching pole. Again, the bucket 24 may be an integral construction with the launching pole, but the pieces are desirably separable to facilitate disassembly and storage.

In yet another preferred embodiment, the outer tubular member of the cantilever beam assembly desirably includes a lock pin assembly 50 housed in a U-shaped frame 51. This frame 51 and lock pin assembly 50 are attached to a second lateral sidewall 19 of the outer tubular member 12, being opposite the first lateral sidewall 16. With this embodiment, the inner tubular member further includes a series of longitudinally spaced clear holes 52 being fashioned for pinned connection with the lock pin assembly 50 in order to secure the inner 11 and outer 12 tubular members in a predetermined telescoping spaced relationship.

While the present invention has been described in connection with the illustrated embodiments, it will be appreciated and understood that modifications may be made without departing, from the true spirit and scope of the invention.

I claim:

1. A winch supported cargo strap coil launching device, comprising:
   (a) a cantilever beam assembly having an inner tubular member co-axially disposed in forming a telescoping joint connection with an outer tubular member;
   (b) a transverse support member having a first end connected to a first lateral side wall of said outer tubular member, and a second end capable of being carried in a spool aperture of a cargo strap winch assembly;
   (c) an outwardly extending U-shaped bracket member having a base connected to a distal end of said inner tubular member, and a first and second parallel legs outwardly extending at opposite ends of said base, said legs including respectively aligned apertures;
   (d) a launching pole having an upper end and a lower end, said lower end including a means for pivotal connection with said U-shaped bracket member;
   (e) a cargo strap coil bucket assembly having a bucket with a generally rectangular ejection opening so that said bucket is capable of retaining and then releasing a cargo strap coil, said bucket including a back wall including a connector adapted to connect said back wall of said bucket to said upper end of said pole.

2. The winch supported cargo strap coil launching device according to claim 1, wherein said means for pivotal connection comprises a generally T-shaped pipe connector including an elongated pipe having a pair of horizontally aligned branches outboard an upstanding branch, said upstanding branch adapted to connect with said lower end of said pole and said horizontally aligned branches having opposite ends thereof being pivotally connected to said U-shaped bracket member in longitudinal axial alignment between said respectively aligned apertures.

3. The winch supported cargo strap coil launching device according to claim 1, wherein said means for pivotal connection comprises the lower end of said launching pole being formed as a generally T-shaped pipe connector having an elongated pipe including a pair of horizontally aligned branches outboard said launching pole, said horizontally aligned branches having opposite ends thereof being pivotally connected to said U-shaped bracket member in longitudinal axial alignment between said respectively aligned apertures.

4. The winch supported cargo strap coil launching device according to claim 1, further comprising a transverse bearing plate having a lateral edge thereof attached adjacent to said first sidewall of said outer tubular member and being positioned in a spaced relationship between said transverse support member and a proximal end of said outer tubular member so that a distal face of said plate is capable of bearing against a frame leg of said cargo strap winch assembly to support an axial load exerted on said cantilever beam assembly.

5. The winch supported cargo strap coil launching device according to claim 1, wherein the cargo strap winch assembly is a track supported winch assembly.

6. The winch supported cargo strap coil launching device according to claim 1, wherein said connector of said bucket assembly is a pipe adapted for spliced fitment with said upper end of said launching pole.

7. The winch supported cargo strap coil launching device according to claim 2, wherein said horizontally aligned branches and said upstanding branch of said T-shaped connector are hollow pipe members and said pivotal connection means with said T-shaped connector further includes a bar inserted through said branches and carried at opposite ends thereof in said apertures of said legs of said U-shaped bracket member.

8. The winch supported cargo strap launching device according to claim 1, wherein said outer tubular member includes a generally U-shaped frame and lock pin assembly connected to a second sidewall of said outer tubular member, and said inner tubular member sharing a common face with said second sidewall and including a series of clear holes capable of pinned connection with said lock pin assembly.

\* \* \* \* \*